(12) United States Patent
Hirose (10) Patent No.: US 8,497,919 B2
(45) Date of Patent: Jul. 30, 2013

(54) IMAGING APPARATUS AND CONTROL METHOD THEREOF FOR CONTROLLING A DISPLAY OF AN IMAGE AND AN IMAGING CONDITION

(75) Inventor: Minoru Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 12/186,260

(22) Filed: Aug. 5, 2008

(65) Prior Publication Data

US 2009/0040344 A1 Feb. 12, 2009

(30) Foreign Application Priority Data

Aug. 6, 2007 (JP) ................... 2007-204352

(51) Int. Cl.
*H04N 5/232* (2006.01)
*H04N 5/235* (2006.01)

(52) U.S. Cl.
USPC .................................. 348/221.1; 348/350

(58) Field of Classification Search
USPC .......... 348/221.1, 222.1, 223.1, 345
See application file for complete search history.

(56) References Cited

U.S. PATENT DOCUMENTS

| | | | | |
|---|---|---|---|---|
| 5,712,682 A | * | 1/1998 | Hannah | 348/255 |
| 6,639,626 B1 | * | 10/2003 | Kubo et al. | 348/218.1 |
| 7,573,505 B2 | * | 8/2009 | Kawaguchi et al. | 348/222.1 |
| 8,031,258 B2 | * | 10/2011 | Enge et al. | 348/350 |
| 2001/0055064 A1 | * | 12/2001 | Minakami | 348/222 |
| 2004/0212691 A1 | * | 10/2004 | Sato | 348/223.1 |
| 2007/0272871 A1 | * | 11/2007 | Schafer et al. | 250/370.09 |
| 2007/0296828 A1 | * | 12/2007 | Onomura | 348/222.1 |
| 2008/0180547 A1 | * | 7/2008 | Hirose | 348/229.1 |
| 2009/0003813 A1 | * | 1/2009 | Ohishi | 396/55 |
| 2010/0026835 A1 | * | 2/2010 | Negishi et al. | 348/223.1 |

FOREIGN PATENT DOCUMENTS

| | | |
|---|---|---|
| JP | 2001251540 A | 9/2001 |
| JP | 2003-289472 | 10/2003 |
| JP | 2007150643 A | 6/2007 |

* cited by examiner

*Primary Examiner* — Tuan Ho
*Assistant Examiner* — Selam Gebriel
(74) *Attorney, Agent, or Firm* — Canon U.S.A., Inc. IP Division (57) ABSTRACT

An imaging apparatus includes a first output unit configured to perform first gain processing on an analog signal corresponding to an electric charge stored in a photoelectric conversion element in a first region and output the processed signal, a second output unit configured to perform second gain processing on an analog signal corresponding to an electric charge stored in a photoelectric conversion element in a second region and output the processed signal, an instruction unit configured to instruct a gain of each gain processing in the first and second output units, a first control unit configured to control a display of an image based on an output signal from the first output unit, and a second control unit configured to control an imaging condition based on an output signal from the second output unit. The second gain processing is different from the first gain processing.

6 Claims, 9 Drawing Sheets

| EXPOSURE COMPENSATION AMOUNT | FIRST GAIN CIRCUIT SETTING (FOR DISPLAY) | SECOND GAIN CIRCUIT SETTING (FOR DETECTING IMAGING CONDITION) |
|---|---|---|
| -3 STEP | ISO 100 | ISO 800 |
| -2 STEP | ISO 100 | ISO 400 |
| -1 STEP | ISO 100 | ISO 200 |
| ±0 STEP | ISO 100 | ISO 100 |
| +1 STEP | ISO 200 | ISO 100 |
| +2 STEP | ISO 400 | ISO 100 |
| +3 STEP | ISO 800 | ISO 100 |

IMAGING APPARATUS AND CONTROL METHOD THEREOF FOR CONTROLLING A DISPLAY OF AN IMAGE AND AN IMAGING CONDITION

BACKGROUND OF THE INVENTION

1. Field of the Invention

The present invention relates to an imaging apparatus capable of detecting an imaging condition with a high accuracy while appropriately displaying an image.

2. Description of the Related Art

Currently, many imaging apparatuses are provided with a live view function that can sequentially display image signals which are continuously read from an image sensor, on a display device such as a liquid crystal display (LCD) monitor disposed on a rear surface or the like of a camera to confirm an image to be captured.

Further, many imaging apparatuses detect an imaging condition such as an object luminance, an in-focus state, and color temperature that appropriately produces a white image based on an output signal read from the image sensor.

However, when an effect of exposure compensation made according to the detected object luminance is to be confirmed using an image displayed by the live view function, an image signal may not be appropriately displayed. This is because the signal read from the image sensor is shifted from a level appropriate to detect the imaging condition.

That is, when exposure compensation is shifted to overexposure, the pixel signals may be saturated. When the exposure compensation is shifted to underexposure, the pixel signals may be collapsed. If the object luminance, an in-focus state, and color temperature that appropriately produces a white image are detected based on the image signal that is not appropriately compensated for detecting the imaging condition, a detection accuracy is reduced.

Japanese Patent Application Laid-open No. 2003-289472 discusses a technology that solves the problem. According to the technology, when the exposure compensation is performed, a signal on which exposure compensation is not performed is read by the image sensor, and a luminance level is adjusted by multiplying a signal from a video random access memory (VRAM) for displaying the image by a gain to display the image.

However, the new technology described above may seriously deteriorate a signal-to-noise (SN) ratio depending on an exposure compensation amount, since the luminance level is adjusted by multiplying the output signal from the VRAM by the gain when the image is displayed.

SUMMARY OF THE INVENTION

The present invention is directed to an imaging apparatus capable of detecting an imaging condition without reducing an accuracy while displaying an image based on an image signal with a good SN ratio, even when a user gives an instruction about a gain.

According to an aspect of the present invention, an imaging apparatus includes a first output unit configured to perform first gain processing on an analog signal corresponding to an electric charge stored in a photoelectric conversion element in a first region and output the processed signal, a second output unit configured to perform second gain processing on an analog signal corresponding to an electric charge stored in a photoelectric conversion element in a second region and output the processed signal, an instruction unit configured to instruct a gain of each gain processing in the first and second output units, a first control unit configured to control a display of an image based on an output signal from the first output unit, and a second control unit configured to control an imaging condition based on an output signal from the second output unit. The second gain processing is different from the first gain processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

An image apparatus according to an exemplary embodiment of the present invention can detect an imaging condition without reducing an accuracy, while an image is displayed based on an image signal having a good SN ratio using an output signal adjusted for a display. Detection of the imaging conditions refers to detecting, for example, a subject luminance, an in-focus state and a color temperature for appropriately producing a white image.

First Exemplary Embodiment

Figure 1:
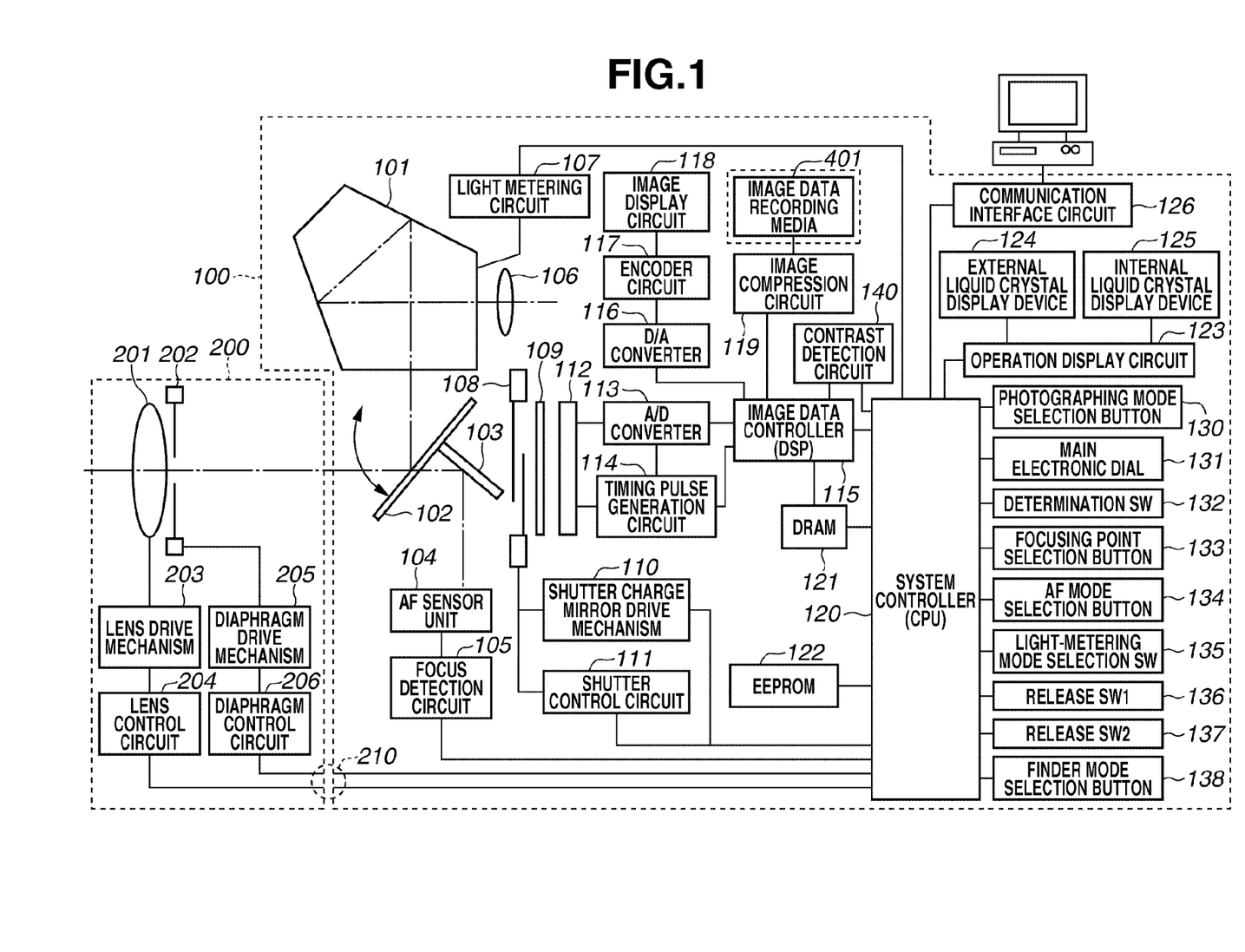
FIG. 1 is a block diagram illustrating a configuration of an imaging apparatus according to an exemplary embodiment of the present invention.

FIG. 1 is a block diagram illustrating an electrical configuration built in a digital camera system of a single-lens reflex type according to the exemplary embodiment of the present invention.

As illustrated in FIG. 1, an imaging lens unit 200 is detachably mounted on a digital camera 100 of the present exemplary embodiment via a mount mechanism (not shown). A mounting part includes a group of contact points 210.

The group of contact points 210 transmit a control signal, a state signal, a data signal and the like between the digital camera 100 and the imaging lens unit 200. Owing to the group of contact points 210, the digital camera 100 can communicate with the imaging lens unit 200 to drive an imaging lens 201 having a focus lens and a diaphragm 202 in the imaging lens unit 200. The group of contact points 210 may transmit an optical communication, audio communication and the like as well as an electrical communication.

The exemplary present embodiment illustrates only one imaging lens for convenience sake, however, a digital camera actually includes a plurality of lenses.

Further, the exemplary present embodiment may include one focus lens, or a plurality of focus lenses depending on an optical design.

An imaging light flux from the object image (not shown) is lead to a quick return mirror 102 via the imaging lens 201 including the focus lens and the diaphragm 202. The quick return mirror 102 is driven in an arrow direction as illustrated. A center portion of the quick return mirror 102 is a half mirror, through which a part of the light flux is transmitted when the quick return mirror 102 is driven downward. The transmitted light flux is downwardly reflected by a sub mirror 103 disposed on the quick return mirror 102.

An auto focus (AF) sensor unit 104 is of a known phase difference type which includes a field lens disposed near an image forming surface, a reflection mirror, a second image forming lens, the diaphragm, a line sensor having a plurality of computer controlled display (CCD) and the like (not shown). A focus detection circuit 105 controls the AF sensor unit 104 using the control signal from the system controller 120 and detects a focus by the known phase difference detecting method.

On the other hand, the imaging light flux reflected on the quick return mirror 102 is lead to a user's eye via a pentaprism 101 and an eyepiece lens 106.

When the quick return mirror 102 is driven upward, the light flux from the imaging lens 201 including the focus lens is lead to the image sensor 112 such as complementary metal-oxide semiconductor (CMOS) via a focal plane shutter 108 and a filter 109.

The filter 109 has two functions. One is cutting off infra-red rays to lead only visible light to the image sensor 112. The other is serving as an optical low path filter. The digital camera 100 of the present exemplary embodiment includes a system controller 120 including the CPU that controls the entire digital camera 100 and appropriately controls an operation of each part of the digital camera 100 as described below.

The system controller 120 is connected with a lens control circuit 204 configured to control a lens driving mechanism 203 that moves the imaging lens 201 described above in an optical axis direction to perform focus adjustment. Further, the system controller 120 can be connected with an external computer via a communication interface circuit 126. Furthermore, the system controller 120 is connected with a diaphragm control circuit 206 configured to control a diaphragm driving mechanism 205 that drives the diaphragm 202 described above. Furthermore, the system controller 120 is connected with a shutter charge and mirror driving mechanism 110 configured to perform control to drive upward and downward a quick return mirror 102 and to carry out shutter-charge of a focal plane shutter 108.

Further, the system controller 120 is connected with a shutter control circuit 111 configured to control travel of a first and second curtains of the focal plane shutter 108. Further, the system controller 120 is connected with a light metering circuit 107 that is an automatic exposure device connected with a light metering sensor (not shown) configured to detect an object luminance which is disposed near the eyepiece lens 106 described above.

Further, the system controller 120 is connected with an electrically erasable and programmable read only memory (EEPROM) 122 that stores a parameter which is to be adjusted for controlling the digital camera 100 and camera identification data (ID) information for identify an individual digital camera. The EEPROM 122 also stores AF compensation data, an automatic exposure compensation value, and the like adjusted by the reference lens.

The lens control circuit 204 includes a lens data storage device configured to store individual information such as a focus length and full-aperture value, lens ID assigned to each lens, and information received from the system controller 120.

A light metering sensor connected with the light metering circuit 107 described above is configured to measure luminance of the object, and an output of the light metering sensor is supplied to the system controller 120 via the light metering circuit 107.

The system controller 120 controls the lens driving mechanism 203 to form an image of the object on the image sensor 112. Further, the system controller 120 controls the diaphragm driving mechanism 205 that drives the diaphragm 202 based on a set diaphragm value and further outputs a control signal to the shutter control circuit 111 based on the set shutter-speed value.

Furthermore, the system controller 120 is connected with an image data controller 115. The image data controller 115 includes a digital signal processor (DSP). The image data controller 115 controls the image sensor 112, and corrects and processes an image data that is input by the image sensor 112 based on an instruction from the system controller 120. Automatic white balance is included in the correcting and processing of the image data.

The automatic white balance functions to correct a signal and adjust a color temperature of the image so that a white image is appropriately produced even when a light source has a different color temperature. The automatic white balance can change a correction amount in response to an instruction from the system controller 120.

The image data controller 115 divides the image signal into regions and supplies to the system controller 120 an value integrated for each bayer pixel in each region. The system controller 120 evaluates the integrated value by detecting the luminance of the object.

The image data controller 115 is connected with a timing-pulse generation circuit 114 that outputs a pulse signal necessary for driving the image sensor 112. The image sensor 112 as well as an analog/digital (A/D) converter 113 that converts an analog signal corresponding to the object image output from the image sensor 112 into a digital signal upon receiving a timing pulse generated in the timing-pulse generation circuit 114 is connected with the image data controller 115.

Further, the image data controller 115 is connected with a dynamic random access memory (DRAM) 121 that temporarily stores an obtained image data (digital data). The image data controller 115 is further connected with a digital/analog (D/A) converter 116, an image compression circuit 119, and a contrast detection circuit 140.

The D/A converter 116 is connected with the image display circuit 118 via an encoder circuit 117. The image display circuit 118 displays the image data captured by the image sensor 112 and generally includes a color liquid crystal display element.

The image data controller 115 converts the image data on the DRAM 121 into an analog signal by the D/A converter 116 and outputs the analog signal to the encoder circuit 117. The encoder circuit 117 converts the output of the D/A converter 116 into a video signal (for example, national television system committee (NTSC) signal) necessary for driving the image display circuit 118.

The contrast detection circuit 140 performs processing based on an instruction of the system controller 120. The contrast detection circuit 140 causes the image data corrected by the image data controller 115 to pass through a filter having a predetermined frequency characteristic, and performs predetermined gamma processing on the image data based on the data passed through the filter.

The contrast detection circuit 140 evaluates a contrast of the image to generate a contrast evaluation value, which is supplied to the system controller 120. The system controller 120 communicates with the lens control circuit 204 to adjust a focal position so that the contrast evaluation value is increased.

Further, the system controller 120 is connected with an operation display circuit 123 that causes an external liquid crystal display device 124 and an internal liquid crystal display device 125 to display operation mode information and exposure information such as a shutter second time and diaphragm value of the digital camera. The system controller 120 is further connected with a main electronic dial 131, a determination SW 132, and a photographic mode selection button 130 that sets a mode so that an electronic camera can perform an operation desired by a user.

The system controller 120 is connected with a focusing point selection button 133 that selects a focus detection position to be used from among a plurality of focus detection positions sensed by the AF sensor unit 104. The system controller 120 is connected with an auto focus (AF) mode selection button 134, a light-metering mode selection button 135, and a release SW1 136 that starts detecting imaging conditions such as light metering and focusing. The system controller 120 is connected with a release SW2 137 and a finder mode selection button 138.

One of modes that can be changed by the finder mode selection button 138 is an optical finder mode that can confirm light flux passing through the eyepiece lens 106. Another mode is a live view mode that can sequentially display the image signal received by the image sensor 112 with the image display circuit 118.

Now, with reference to FIG. 6 to FIG. 9, the image sensor 112 including a plurality of photoelectric conversion elements will be described.

Figure 6:
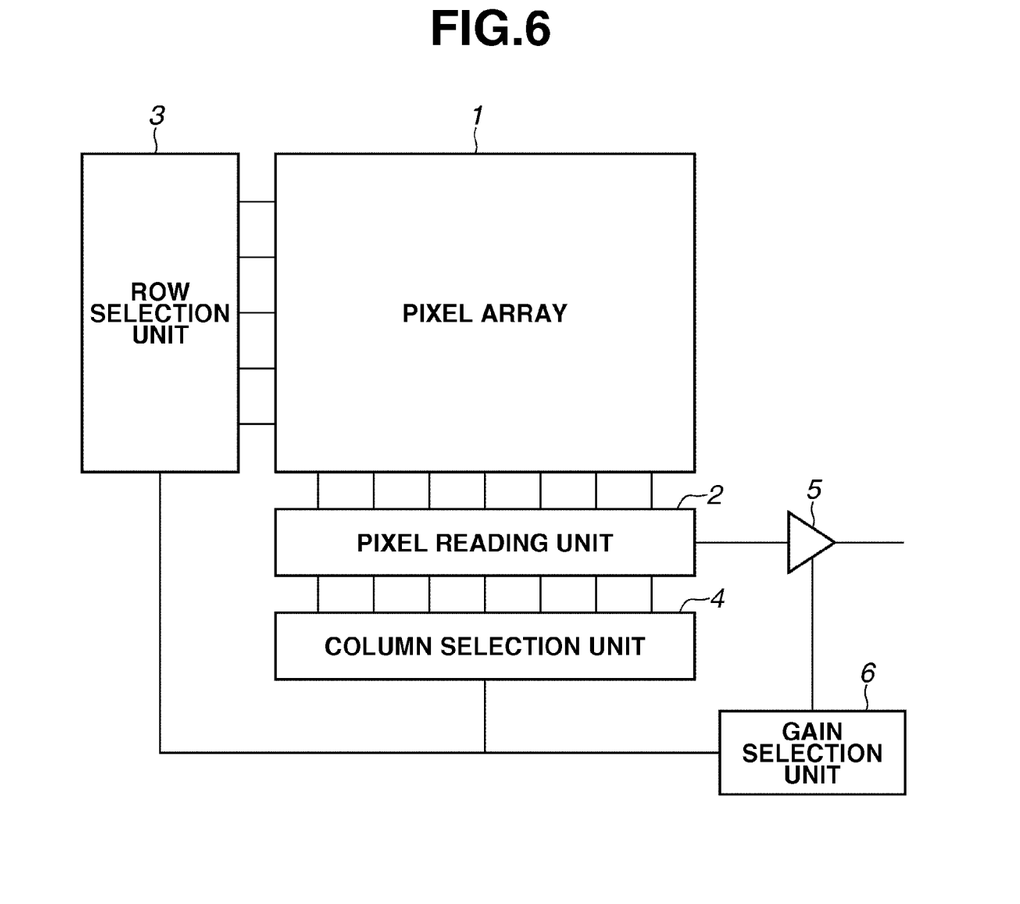
FIG. 6 is a block diagram illustrating a unit of image sensor according to the exemplary embodiment of the present invention.

The image sensor 112 is an imaging unit that can select how much a signal is to be amplified (gained) with a periodicity for each row or each column. Thus, outputs having different luminance levels can be obtained by one exposure, one storage of charges and one reading of pixel signals.

FIG. 6 illustrates an exemplary configuration of the image sensor 112. A pixel array 1 configured by pixels includes a plurality of photoelectric conversion units including photoelectric conversion elements which are disposed in horizontal and vertical directions.

A pixel reading unit 2 reads a pixel signal from the pixel array 1 and sequentially reads pixel signals from a pixel selected by a row selection unit 3 and a column selection unit 4. A gain circuit 5 can set a plurality of different types of gains, and amplifies and outputs the pixel signal with a gain selected by a gain selection circuit 6. The gain selection circuit 6 can set the plurality of different types of gains for each row and each column in a gain circuit 5 for one reading.

Figure 7:
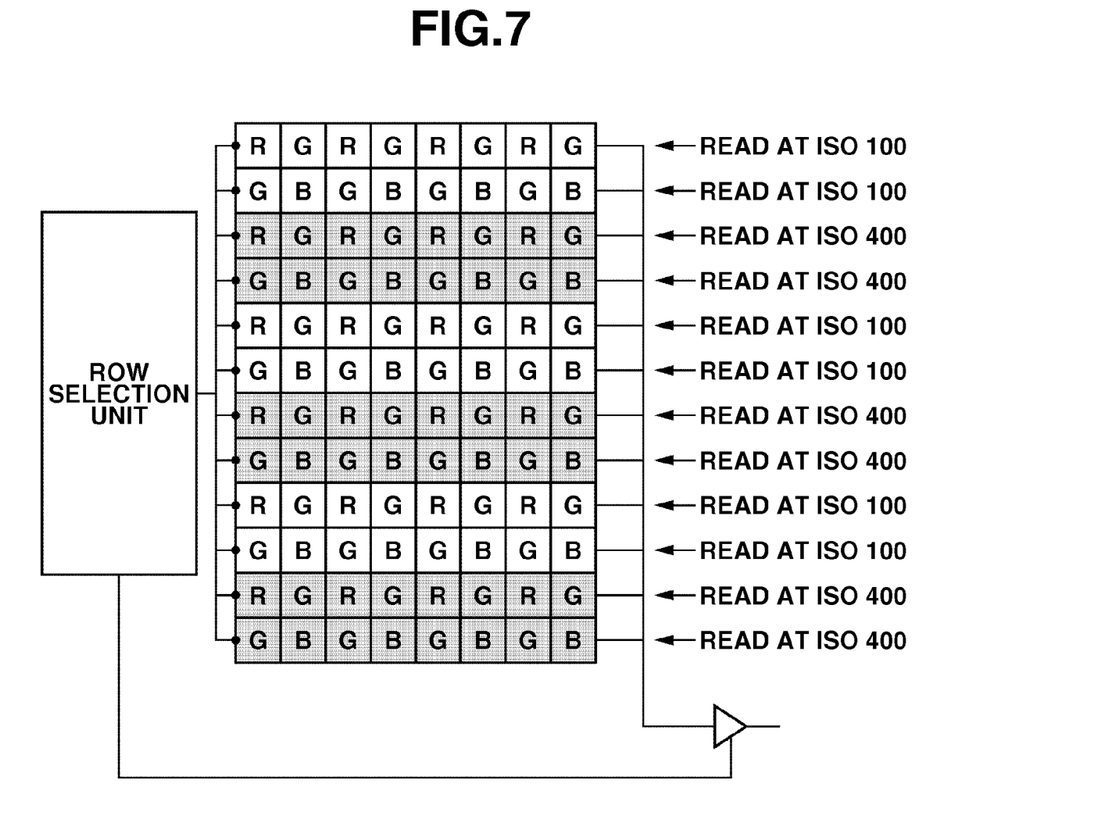
FIG. 7 illustrates reading of all pixels according to the exemplary embodiment of the present invention.

FIG. 7 illustrates a pixel array configured in the pixel array 1 illustrated in FIG. 6 and a selection example of a gain selected by the gain selection circuit 6 when the pixel signal is read. A gain equivalent to ISO 100 and a gain equivalent to ISO 400 are alternately selected every two lines.

Thus, pixel signals multiplied by two kinds of gains are read within one frame. Twelve rows and eight columns are illustrated for simplicity. Further, FIG. 7 illustrates an example in which the two different kinds of gains equivalent to ISO 100 and the gain equivalent to ISO 400 are selected. However, a selected gain value and a number of selected types are not limited to the above example.

Figure 8:
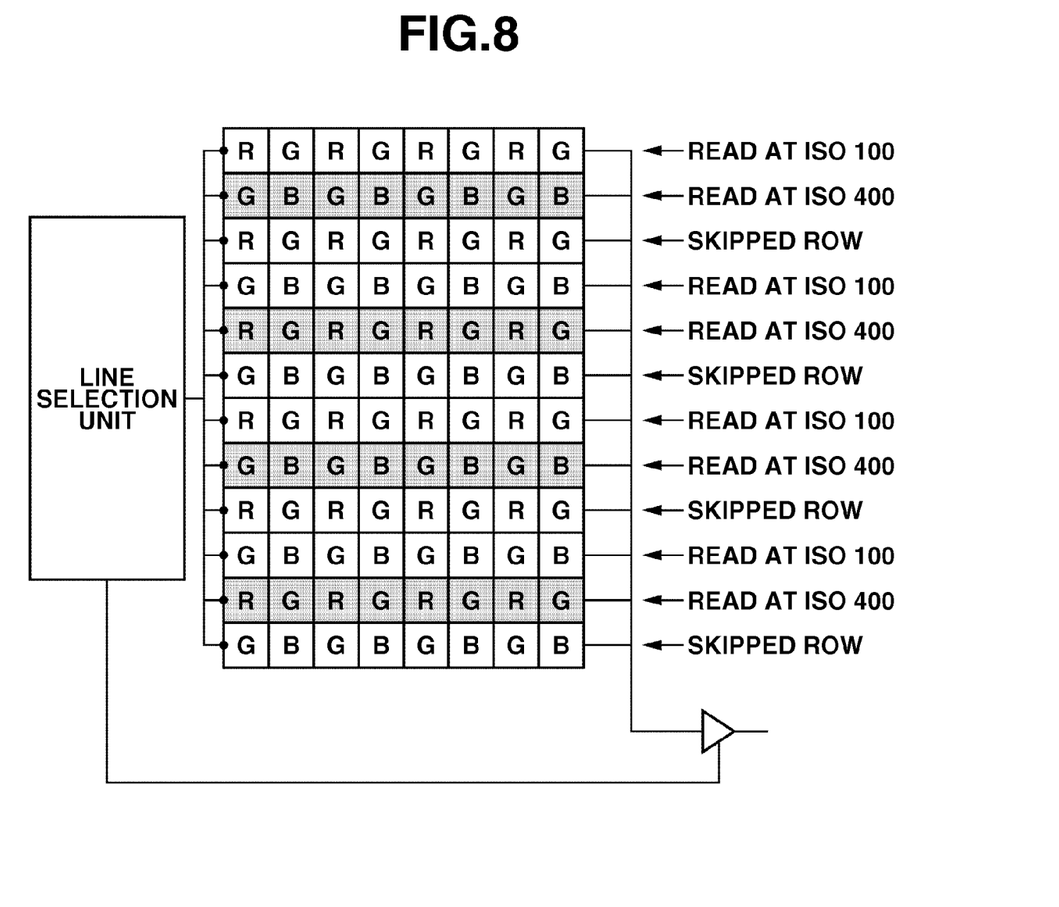
FIG. 8 illustrates skip reading according to the exemplary embodiment of the present invention.

FIG. 8 illustrates an example in which reading is carried out in a thinning-out manner. In this example, one row is skipped every three rows. The gain equivalent to ISO 100 and the gain equivalent to ISO 400 are alternately selected and read for each row.

By performing such thinning-out reading, it is possible to reduce a reading time for one frame. In the example, one line is skipped every three lines. However, a cycle of skipping is not limited to one skipping every three lines.

Figure 9:
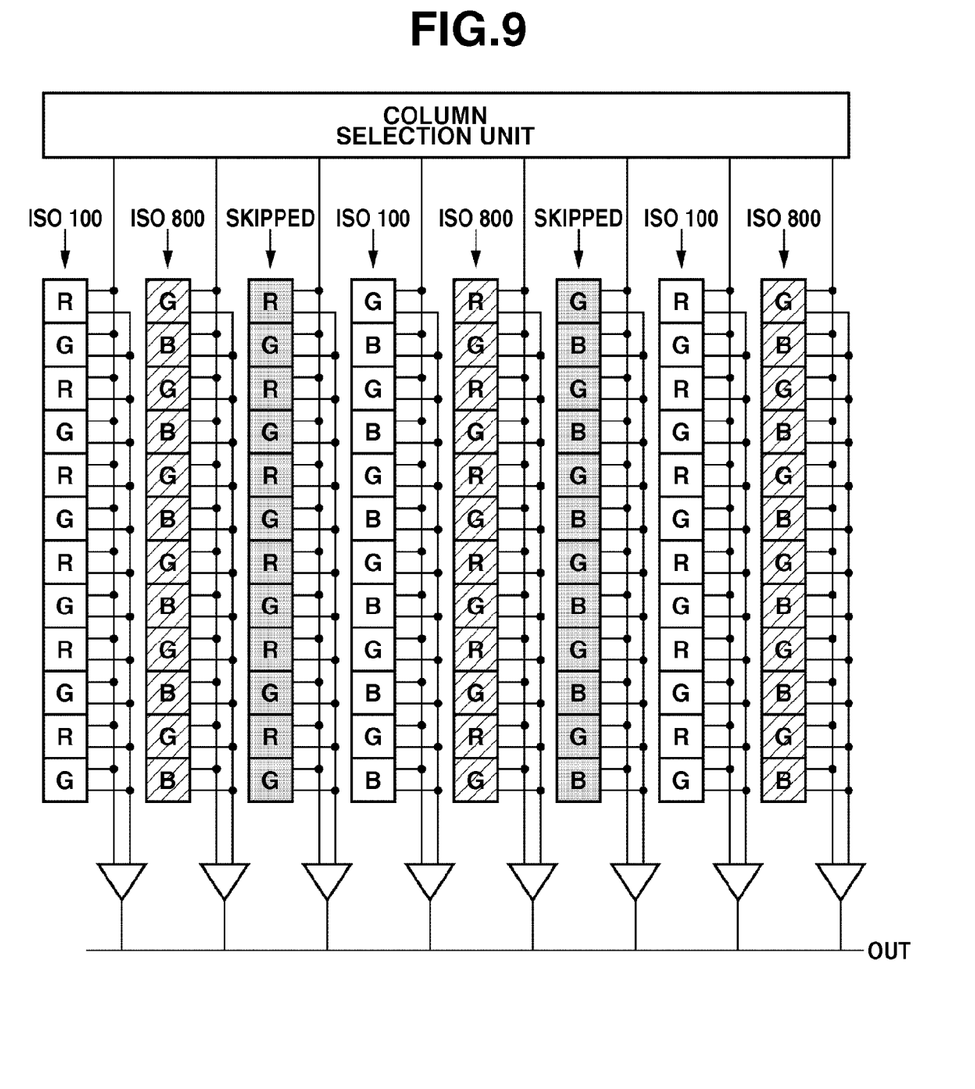
FIG. 9 illustrates reading gains for each pixel according to the exemplary embodiment of the present invention.

FIG. 9 illustrates an example that a gain setting of the pixel signal to be read is selected for every one line by a gain selection circuit 6, and one line is skipped every three lines. In this example, a gain equivalent to ISO 100 and a gain equivalent to ISO 800 are alternately selected and read for each column.

FIG. 9 illustrates an example that one line is skipped every three lines so that two different kinds of gains are selected. However, the skipping cycle, a gain value and the number of gain types are not limited to the example.

Figure 2:
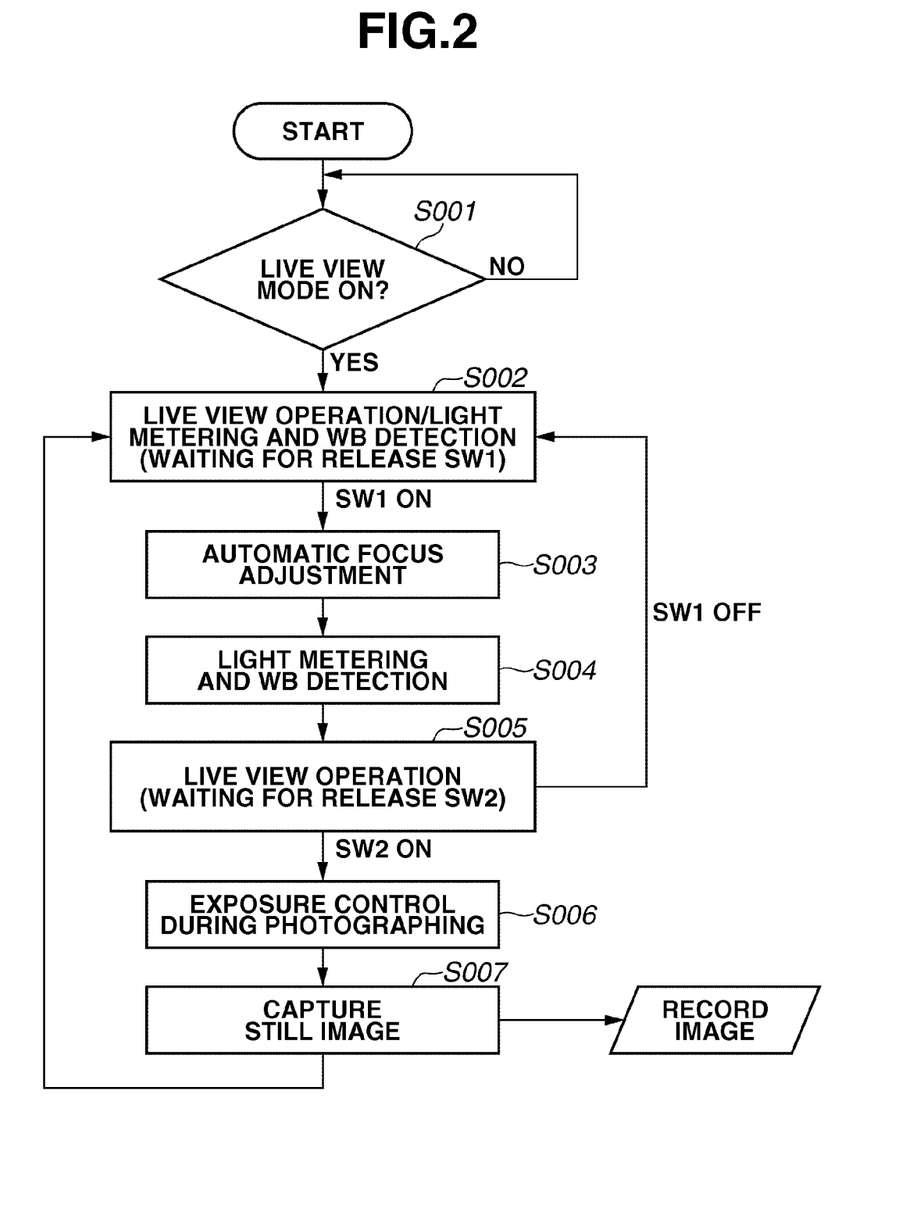
FIG. 2 is a flowchart illustrating an operation of the imaging apparatus according to the exemplary embodiment of the present invention.

With reference to FIG. 2, an operation of the digital camera system configured as described above according to a first exemplary embodiment of the present invention will be described in detail.

In step S001, the system controller 120 determines whether the finder mode selection button 138 instructs to start the live view mode. If it is determined that the finder mode selection button 138 instructs to start the live view mode (YES in step S001), the system controller 120 drives up the quick return mirror 102 and opens the focal plane shutter 108. Accordingly, the image sensor 112 is kept exposed to light flux passing through the imaging lens unit 200. Then, the processing proceeds to step S002.

Figure 3:
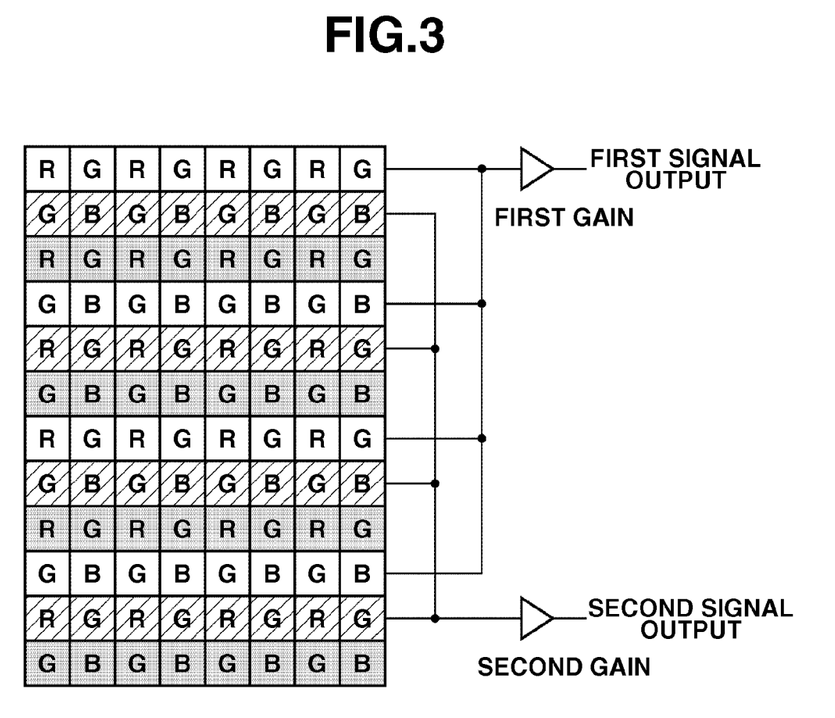
FIG. 3 illustrates reading gains for each pixel according to the exemplary embodiment of the present invention.
Figure 4:
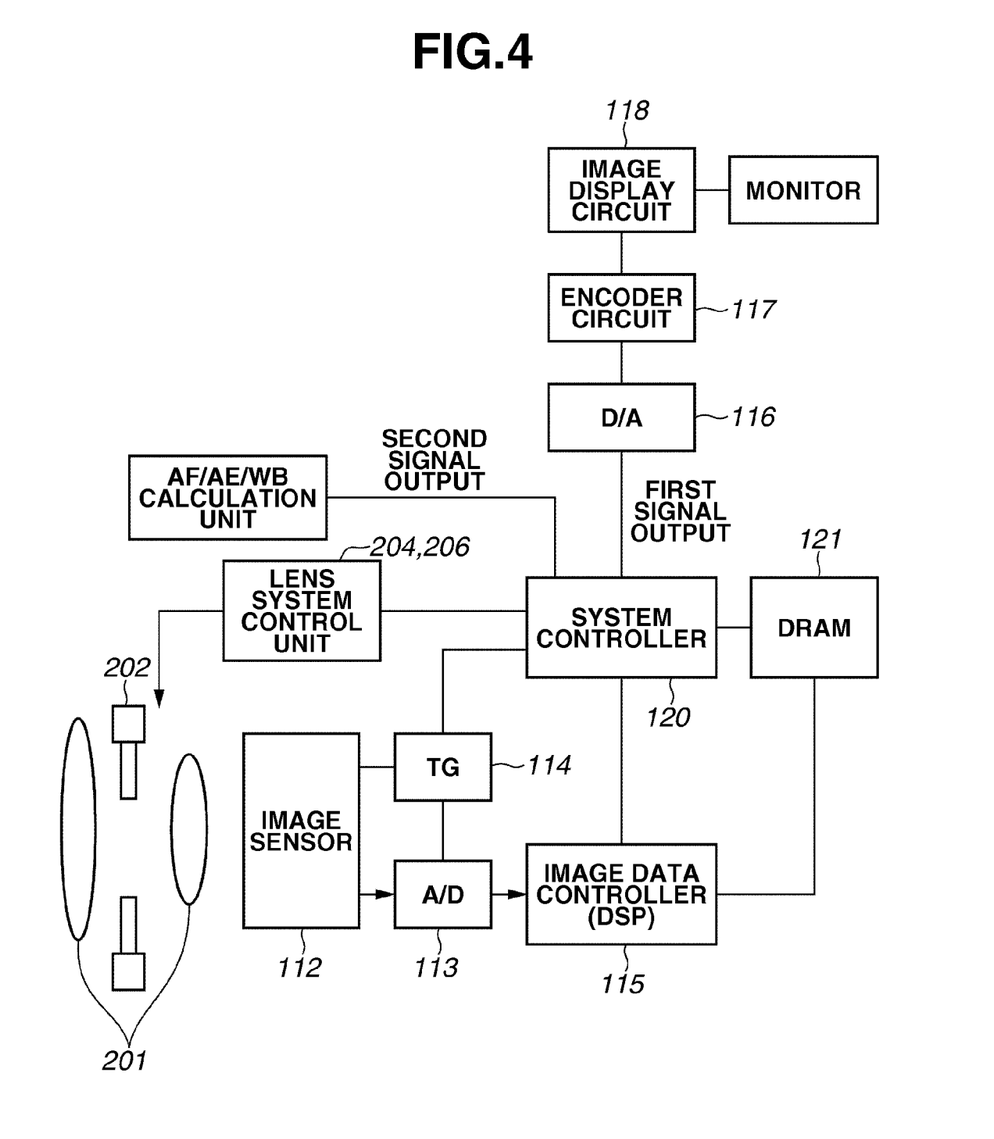
FIG. 4 is a block diagram illustrating a configuration of a major part of the imaging apparatus according to the exemplary embodiment of the present invention.

With reference to FIGS. 3 and 4, a live view operation in step S002 will be described. FIG. 3 illustrates a case of thinning-out reading described in FIG. 8.

In the live view operation, the system controller 120 sets a time for storing an electric charge for the diaphragm 202 and the image sensor 112 so that an appropriate pixel signal can be obtained regardless of an exposure compensation amount and the like specified by a user.

Figure 5:
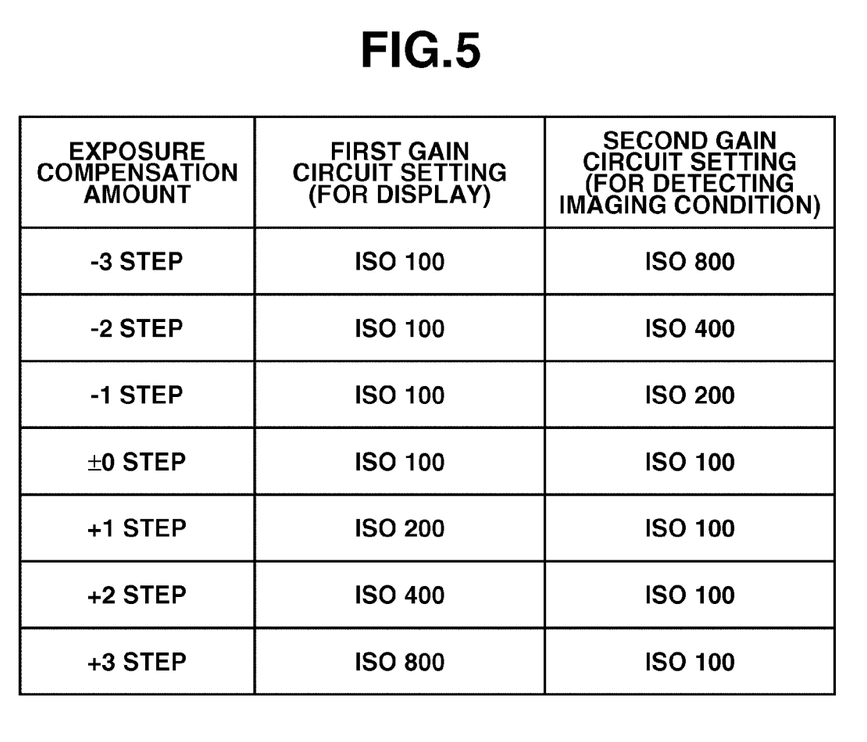
FIG. 5 illustrates an example of a gain circuit setting according to the exemplary embodiment of the present invention.

And the system controller 120 performs a first gain circuit setting on the image sensor 112 so that a first signal output from the image sensor 112 has a luminance level adjusted to a gain specified by a user for a display. For example, when the user specifies +3 step as illustrated in FIG. 5, the system controller 120 sets the gain processing equivalent to ISO 800.

On the other hand, the system controller 120 performs a second gain circuit setting of the image sensor 112 so that a second signal output from the image sensor 112 has a luminance level for focusing, light metering, and detecting WB. For example, if the user specifies +3 step as illustrated in FIG. 5, the system controller 120 sets the gain processing equivalent to ISO 100.

With the arrangement as described above, when the user gives an instruction for the gain, the system controller 120 outputs an output signal on which the first gain processing corresponding to the instruction is performed and another output signal on which the second gain processing different from the first gain are performed.

Since exposure, storage of electric charges and reading of pixel signals are performed in a same frame, the luminance level of the first output signal is shifted by a difference between the gain circuit settings.

Therefore, the first and second signal outputs have high correlation between captured images thereof. In a case where a first and second signal outputs are output in different frames, such high correlation cannot be obtained.

A captured image can be corrected in light metering and WB detection based on the captured image itself. However, as to focusing, subsequent images of the captured image are corrected based on the captured image. Accordingly, detecting a contrast based on the second signal output as described above is more significant in the focusing.

Next, the system controller 120 converts first analog signals output continuously read from the image sensor 112 into digital signals by the A/D converter 113, as illustrated in FIG. 4. The image data controller 115 then performs image processing on the digital signals. The image data is transferred to the image display circuit 118 via the D/A converter 116 and the encoder circuit 117, and sequentially displayed on the LCD monitor disposed on a rear surface or the like of the camera.

The system controller 120 performs the light metering and WB detection based on the second signal output read from the image sensor 112 and set the diaphragm value, storing time, and gain circuit by an auto exposure control function. Further, a white balance is adjusted by a WB control function so that a white image is appropriately produced.

FIG. 5 illustrates an example of combinations of set values of gain circuit settings for a display and correction, when each exposure compensation amount is set. In FIG. 5, the second signal output from the image sensor 112 is adjusted by the second gain circuit setting to have an appropriate luminance level.

On the other hand, the first signal output from the image sensor 112 adjusted by the first gain circuit setting for a display is set to have a luminance level equivalent to the exposure compensation instructed by the user. For example, as illustrated in FIG. 5, in a case of ISO 100 for ±0 step, if the user specifies −3 step, procedures will be performed as follows.

Since ISO 100 is used for the smallest gain processing in the present exemplary embodiment, an exposure control is performed, the diaphragm is narrowed, and the storage time of the electric charge is reduced corresponding to the exposure compensation amount equivalent to −3 step. In this case, since the processing can generate 100% black, which is inappropriate for detecting the imaging condition, the gain processing equivalent to ISO 800 is performed on the second output signal.

FIG. 5 is only an example of combinations, and combinations are not limited to the example. Further, the second output signal for detecting the imaging condition needs to be adjusted so that a result with a high accuracy can be obtained for detecting the imaging condition such as an object luminance, an in-focus condition and color temperature for appropriately producing a white image.

Furthermore, a step such as a +3 step and −1 step is specified for the exposure compensation amount as a method for instructing the gain by the user. However, the method for instructing the gain such as ISO 800 and ISO 100 may also be adopted. In this case, the first output signal for performing the gain processing based on the user's instruction and the second output signal corresponding to the imaging condition are output.

Next, when a release SW1 is pressed in step S002 illustrated in FIG. 2, the processing proceeds to step S003. The system controller 120 sets the second gain circuit setting so that the appropriate pixel signal for detecting the contrast, object luminance and color temperature of the object can be obtained.

The second signal that is output from the image sensor 112 is supplied to the contrast detection circuit 140. The system controller 120 communicates with the lens control circuit 204 based on an output result of the contrast detection circuit 140 and moves the focus lens to adjust a focusing state. When the focusing state is adjusted, the processing proceeds to step S004.

In step S004, similar to the live view operation, the system controller 120 detects (light-meters) the object luminance based on the output signal read from the image sensor 112 to calculate a luminance value for imaging (Bv). At the same time, the system controller 120 also detects the WB. The processing proceeds to step S005.

In step S005, while the release SW1 136 is being pressed, the system controller 120 maintains the Bv value for imaging, and performs the live view operation. The system controller 120 also continues to detect the light metering and WB. When the release SW1 136 is released (SW1 OFF in step S005), the system controller 120 discards the maintained Bv value for imaging, and the processing proceeds to step S002.

When the release SW2 137 is pressed in step S005 (SW2 ON), the processing proceeds to step S006 and the system controller 120 captures a still image. In this case, the system controller 120 calculates the Bv value from the imaging condition acquired in step S004.

The system controller 120 sets the exposing condition of the camera according to an imaging parameter such as the Bv value, imaging mode set by the user, and exposure compensation amount. The value of the first gain circuit setting is set to the same value as the second gain circuit setting.

The targeted Bv value is calculated based on a signal appropriate for determining the imaging condition acquired by the second gain. The color temperature for appropriately producing a white image to take a still picture in the present exemplary embodiment is detected from the still image itself.

In step S007, the system controller 120 closes the opened focal plane shutter 108 to perform a spring charge, causes a first and second curtains to run at a set Tv value, and performs a normal imaging operation that sequentially reads the image signal from the image sensor 112 without skipping lines.

The image data controller 115 processes the image correction processing on the read image signal, and the image compression circuit 119 converts the image signal into joint photographic experts group (JPEG) or the like. Subsequently, a storage media 401 stores the image.

When the image sensor 112 completes reading, the system controller 120 maintains a state where the mirror is driven upward and the shutter curtains are open, and returns to step S002 to resume the live view operation.

According to the present exemplary embodiment, even when the user gives the instruction for the gain processing, it is possible to detect the imaging condition with a high accuracy while showing the live view display based on the signal having a good SN ratio.

The present exemplary embodiment describes the example that two kinds of gains are set, however, the number of the gains are not limited to the example. Display and correction may be performed using a plurality of kinds of output signals.

In addition to gain processing described in FIGS. 6 to 9, other gain processing that adds a stored signal for each pixel can be considered. In this case, when the user gives the instruction for the gain in the gain processing, the signal is added. On the other hand, even when the user gives such an instruction, the processing that adds the signal based on the instruction is not performed but the gain processing appropriate for determining the imaging condition is performed. The above description also holds true with a technological idea such as the gain processing by addition.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-204352 filed Aug. 6, 2007, which is hereby incorporated by reference herein in its entirety.

What is claimed is:

1. An imaging apparatus comprising:
    an image sensor comprising a first photoelectric conversion element in a first region and a second photoelectric conversion element in a second region;
    a first output unit configured to perform first gain processing on a first analog signal corresponding to an electric charge stored in the first photoelectric conversion element in the first region and output a first processed signal corresponding to the first analog signal;
    a second output unit configured to perform second gain processing on a second analog signal corresponding to an electric charge stored in the second photoelectric conversion element in the second region and output a second processed signal corresponding to the second analog signal;
    an instruction unit configured to instruct a gain of the first gain processing and a gain of the second gain processing;
    a conversion unit configured to convert an output signal from the first output unit and an output signal from the second output unit from an analog signal to a digital signal;
    a first control unit configured to control a display of an image based on an output signal from the first output unit; and
    a second control unit configured to control an imaging condition based on an output signal from the second output unit, the second gain processing being different from the first gain processing.

2. The imaging apparatus according to claim 1, wherein the first output unit outputs for each frame an output signal on which the first gain processing is performed based on the instruction, and the second output unit outputs for each frame an output signal on which the second gain processing is performed, when receiving an instruction for a gain from the instruction unit.

3. The imaging apparatus according to claim 1, wherein the second control unit controls a focus lens based on a contrast of the output signal on which the second gain processing is performed, when receiving an instruction for a gain from the instruction unit.

4. The imaging apparatus according to claim 1, wherein the second control unit controls an exposing condition based on the output signal on which the second gain processing is performed, when receiving an instruction for a gain from the instruction unit.

5. The imaging apparatus according to claim 1, wherein the second control unit adjusts a color temperature based on the output signal on which the second gain processing is performed, when receiving an instruction for a gain from the instruction unit.

6. A method for controlling an imaging apparatus including an image sensor comprising a first photoelectric conversion element in a first region and a second photoelectric conversion element in a second region, a first output unit configured to perform first gain processing on a first analog signal corresponding to an electric charge stored in the first photoelectric conversion element in the first region and output a first processed signal corresponding to the first analog signal, and a second output unit configured to perform second gain processing on a second analog signal corresponding to an electric charge stored in the second photoelectric conversion element in the second region and output a second processed signal corresponding to the second analog signal, the method comprising:
    instructing a gain for the first gain processing and a gain for the second gain processing;
    converting an output signal from the first output unit and an output signal from the second output unit from an analog signal to a digital signal;
    controlling a display of an image based on an output signal from the first output unit; and
    controlling an imaging condition based on an output signal from the second output unit,
    the second gain processing being different from the first gain processing.

* * * * *